United States Patent [19]

Nakamura

[11] Patent Number: 4,660,201
[45] Date of Patent: Apr. 21, 1987

[54] FAILURE NOTICE SYSTEM IN A DATA TRANSMISSION SYSTEM

[75] Inventor: Shigeki Nakamura, Tokyo, Japan
[73] Assignee: NEC Corporation, Tokyo, Japan
[21] Appl. No.: 711,430
[22] Filed: Mar. 13, 1985
[30] Foreign Application Priority Data
  Mar. 13, 1984 [JP] Japan ................................ 59-46402
[51] Int. Cl.⁴ ...................... G06F 11/00; G06F 15/16
[52] U.S. Cl. ................................ 371/61; 340/825.16;
                                              364/200; 371/11
[58] Field of Search ............... 371/9, 11, 61; 364/200,
                                              364/900; 340/825.16

[56] References Cited

U.S. PATENT DOCUMENTS

| 4,354,267 | 10/1982 | Mori et al. | 371/11 |
| 4,396,983 | 8/1983 | Segarra et al. | 364/200 |
| 4,498,082 | 2/1985 | Aldridge et al. | 371/11 X |
| 4,511,958 | 4/1985 | Funk | 364/200 |
| 4,546,467 | 10/1985 | Yamamoto | 370/13 |

FOREIGN PATENT DOCUMENTS 57-14921  1/1982  Japan ..................................... 371/61

Primary Examiner—Charles E. Atkinson
Attorney, Agent, or Firm—Sughrue, Mion, Zinn, Macpeak & Seas

[57] ABSTRACT

A failure notification system for a system including a plurality of processors connected by a common path through individual node stations. The failure of a data processor is detected by the associated node station by noting the cessation of clock pulses from the processor. When a data frame from a remote processor is destined for the failed processor and is received by the node station for the failed processor, the latter node station transmits a failure notice frame onto the common path. The destination address and source address of the failure notice frame are the reverse of those addresses in the data frame destined for the failed processor.

2 Claims, 11 Drawing Figures

FAILURE NOTICE SYSTEM IN A DATA TRANSMISSION SYSTEM

BACKGROUND OF THE INVENTION

The present invention relates to a failure notice system in a data transmission system having a plurality of processors.

In a data transmission system for distributed data processing, a common path is connected with a plurality of remote processors, which are usually used as unattended processors and are remote from each other.

A failure of one of the processors can be caused by a power failure or the failure of the other units in the processor. When such a failure occurs, it is necessary to detect the failure and to inform other processors.

One prior art technique for accomplishing this includes a master or supervisor station, which sends periodic inquiries to all processors for the purpose of checking for failures. If no response is received from a processor, the master or supervisor station assumes there is a failure and notifies all other remote processors. This technique significantly adds to the traffic on the common loop.

Japanese Kokai No. 56-34260, published Apr. 6, 1981 describes an example of a technique for detecting and reporting failures, wherein a second common loop, in addition to the data transmission common loop, carries failure notices.

SUMMARY OF THE INVENTION

It is therefore one object of the present invention to provide in a data transmission system a failure notice system, which does not require an additional common loop and does not significantly increase traffic on the common loop.

According to one feature of the present invention, there is provided a data transmission system comprising a plurality of data processors, a plurality of individual transmission lines connected to said processors, respectively, and a common transmission path connected to said node station. Each of the node stations comprises detecting means for detecting the failure of a corresponding data processor. A storing device stores the signal from the detecting means designating the failure of a corresponding data processor. When a remote processor sends out a data frame addressed to the failed processor, the node station for the failed processor, upon receipt of the data frame, sends out a failure notice frame addressed to the remote processor.

DESCRIPTION OF THE PREFERRED EMBODIMENT

Figure 1:
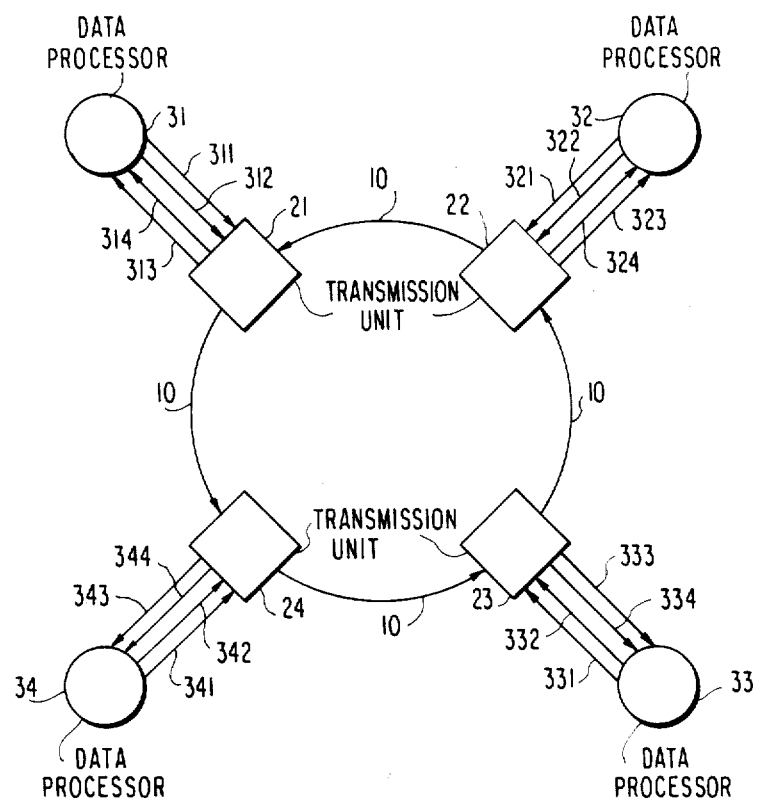
FIG. 1 is a diagram of a loop transmission system embodying the present invention.

Referring to FIG. 1, a loop transmission system embodying the present invention comprises a common transmission loop made up of path 10, node stations 21 to 24 connected to the common transmission loop 10, data processors 31 to 34 connected to the corresponding node stations 21 to 24, respectively, lines 313, 323, 333, and 343 for transmitting data frames from each of the node stations 21 to 24 to each of the data processors 31 to 34, respectively, lines 311, 321, 331 and 341 for transmitting data frames from each of the data processors 31 to 34 to each of the stations 21 to 24, respectively, lines 312, 322, 332, and 342 for transmitting clock signals from each of the data processors 31 to 34 to each of the stations 21 to 24, respectively, and lines 314, 324, 334 and 344 for transmitting clock signals from each of the stations 21 to 24 to each of the processors 31 to 34, respectively.

In the embodiment illustrated data is sent in packets or data frames from one processor to another in one direction around the loop. A data frame, for example a data frame from processor 34 intended for processor 31, will include the address of processor 31 as a destination address (DA), the address of processor 34 as the source address (SA), and information and instruction data for processor 31. A reply data frame from processor 31 to processor 34 will contain a similar format of data.

The data frame from processor 34 will be transferred to node station 24 (it will be noted that the address information as well as other information can be added in the node station when a failure eccurs) and then onto loop 10 where it will travel counterclockwise around loop 10 through node stations 23 and 22 and ultimately to the node station 21. Node station 21 will detect the destination address DA, corresponding to its own or its processor's I.D., and therefore will transfer the data frame to processor 31 where it will be operated upon.

Figure 2:
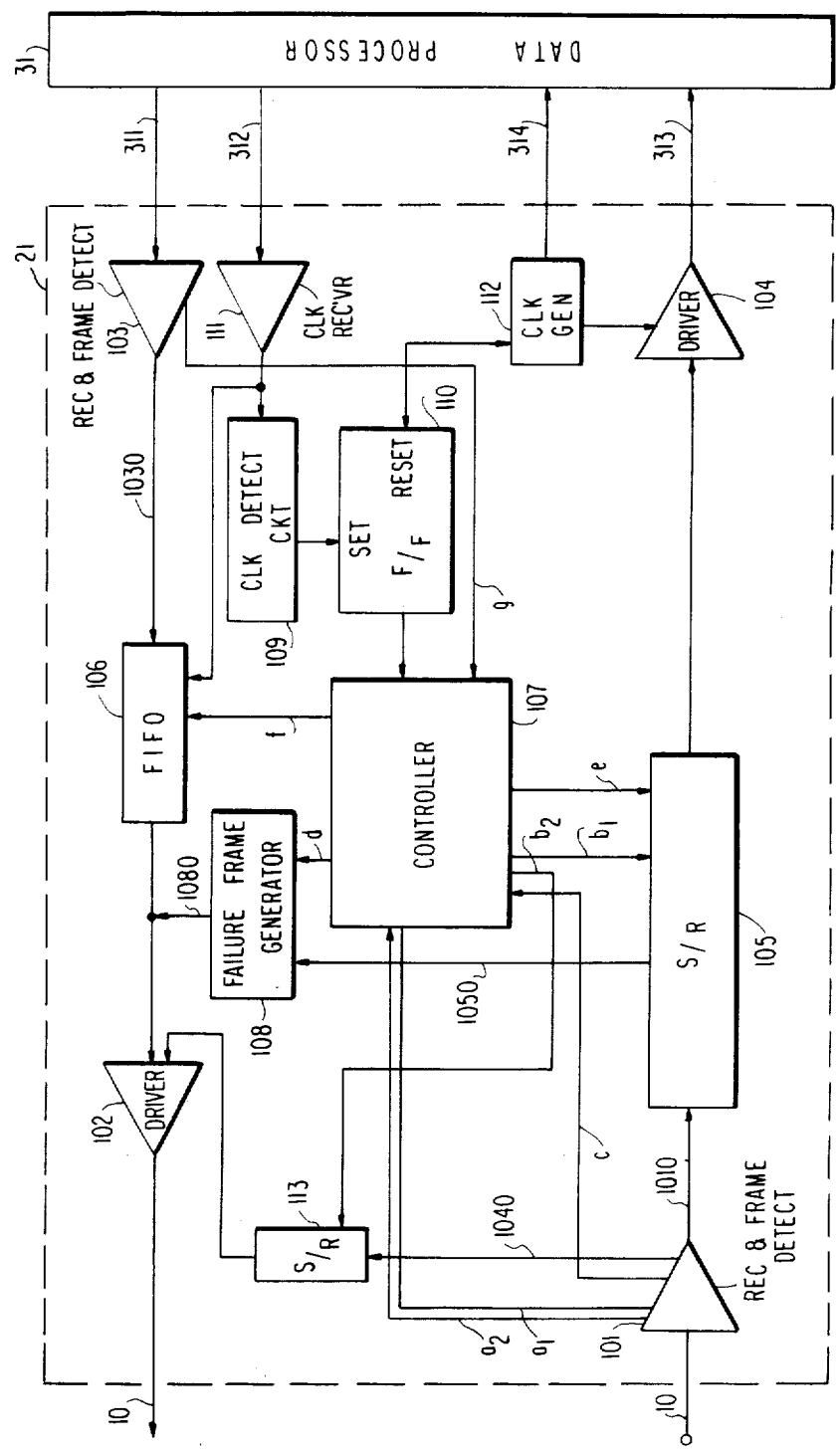
FIG. 2 is a diagram of a node station 21 shown in FIG. 1.

A generalized block diagram of a single node station 21 is illustrated in FIG. 2 along with connections to the associated data processor 31 and the loop 10 input and output lines.

Data received by node station 21 from loop path 10 is applied to a receiver and detector 101. The latter circuit determines if a data frame is addressed to data processor 31 by comparing the destination address field DA of the received data frame with the locally stored address. If the data frame is not destined for processor 31, circuit 101 will, under control of controller 107, transfer the data frame to the shift register 113, and from there the data frame is sent back onto loop path 10 via driver 102.

Figure 3:
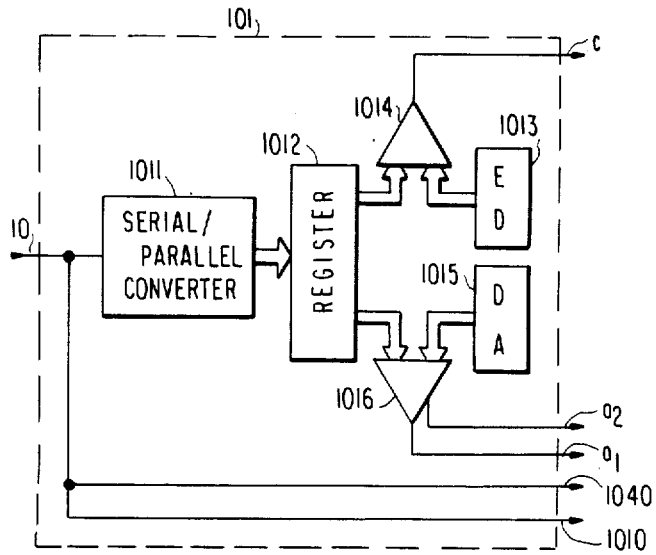
FIG. 3 is a diagram of a receiving and frame detection circuit 101 shown in FIG. 2.

An example of receiver and detector 101 is illustrated in FIG. 3. The incoming data in serial form is converted into a parallel data frame in serial to parallel converter 1011 and temporarily stored in register 1012. The destination address field DA of the received data frame is compared in comparator 1016 with a local destination address from a storage device or generator 1015. If the received data frame contains the local DA, comparator 1016 provides an output control signal a₁ to controller 107 (FIG. 2). If not, comparator 1016 provides a control signal a₂ to controller 107. The controller 107, in turn provides control signal b₂ to register 113.

The receiver and detector 101 also provides the data frame on lines 1010 and 1040 to the registers 105 and 113, respectively. However, entry of the data frame in the shift registers is under control of the controller 107. Control signal b₂ enters the data frame in shift register 113. Control signal b₁ enters the data into shift register 105. The former occurs if the data frame does not include the local DA; the latter occurs, i.e., entry into register 105, if the data frame does include the local DA.

The circuit 101, as seen in FIG. 3, also includes a comparator 1014 which compares every field in the data frame with an end of frame code from a local store or local generator 1013. A valid comparison results in the generation of an end of frame control signal c, which is also applied to the controller 107.

Data entered into register 105 is intended for processor 31. If register 105 receives a control signal e, the data is clocked into data processor 31 via driver 104 under control of clock generator 112. The clocks from generator 112 are also sent to the data processor. The data processor thereafter operates on the information.

Figure 4:
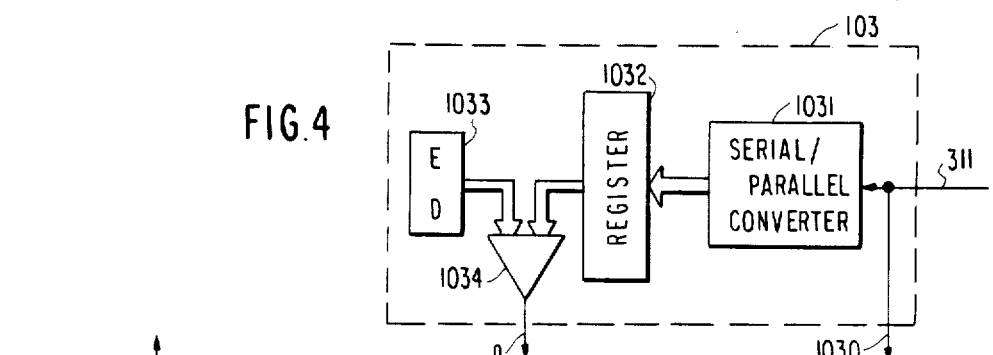
FIG. 4 is a diagram of a receiving and frame detection circuit 103 shown in FIG. 2.

Data frames to be sent by processor 31 to other processors, for example, in response to the above received data frame, are first supplied to receiver and frame detector 103. Also, clock pulses are continuously supplied via line 312 to a clock receiver 111. One example of receiver and frame detector 103 is illustrated in FIG. 4. The serial data frame is converted into a parallel data frame by converter 1031 and entered into register 1032. An end of frame detection is made by comparator 1034 in the same manner as in the circuit 101. A local store or generator 1033 provides an end of frame code for comparison purposes. An end of frame control signal g is supplied to controller 107 and the serial data frame is entered into FIFO 106.

Upon receipt of a control signal f from controller 107, the FIFO sends the data frame onto loop path 10 via driver 102. Clock pulses from the clock receiver 111 control entry of data into FIFO 106.

The controller includes a microprocessor and an interrupt circuit as will be explained hereafter. For the present it should be noted that if the controller receives an end of frame control signal g, it will cause data in FIFO 106 to be generated by generating control signal f. Between receipt of control g and generation of control f, controller 107 will not accept a control signal c.

If the controller receives a control signal c (assuming it is not responding already to a signal g) it will block acceptance of control signal g for a period. During that period, controller 107 first tests for a failure in processor 31. If a failure is detected (in a manner described hereafter), controller 107 generates control signal d which causes a special failure data frame stored in failure frame generator 108 to be sent onto the loop 10 via line 1080 and driver 102. As will be explained subsequently, the failure data frame, in addition to including any special data desired to identify the fact that a failure exists, automatically includes the address of the local data processor 31/terminal unit 21 as the source address of the failure data frame and the address of the processor presently attempting to communicate with processor 31 as the destination address of the failure data frame. That way, the latter processor will receive the failure data frame and detect from which processor it came.

If the test for failure is negative, i.e., no failure, the controller generates control signal e which, as previously noted, causes the received data frame to be applied to data processor 31.

After generating either of control signals d or e, the controller is returned to the state in which it can now accept either g or c end of frame signals.

Figure 10:
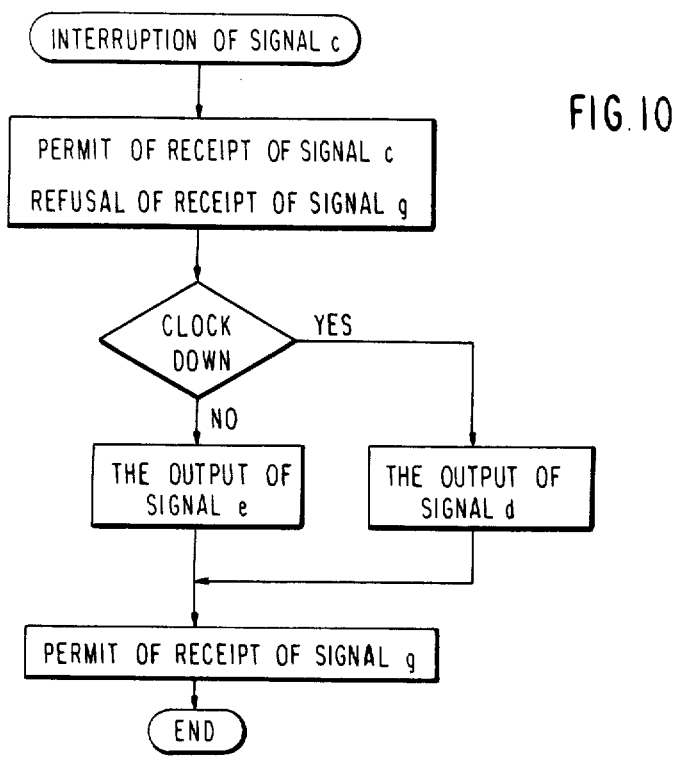
FIGS. 10 and 11 are flowcharts demonstrating the operation of a microprocessor 202, a control store 203, a register 204, and an interruption control circuit 205 shown in FIG. 8.
Figure 11:
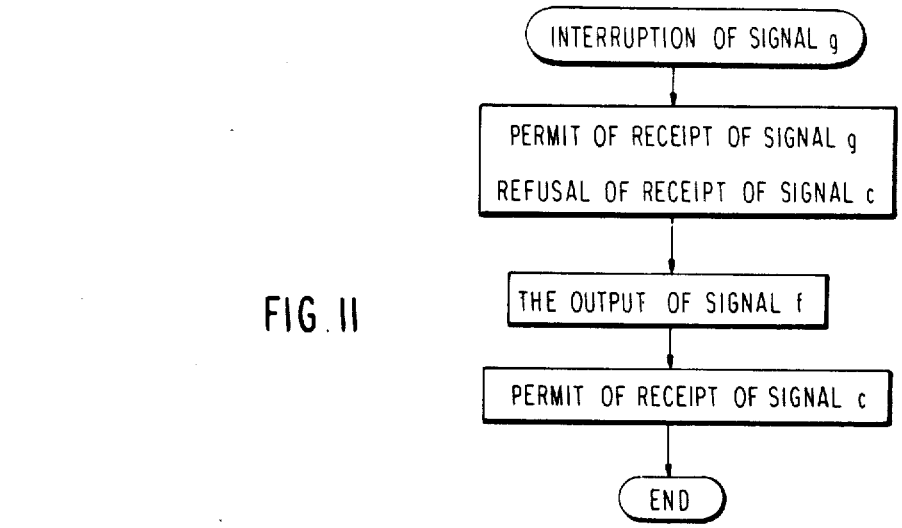

Flow diagrams of the above sequence of operations of controller 107 are shown in FIGS. 10 and 11. FIG. 11 illustrates the sequence when a g end of frame signal is received. FIG. 10 illustrates the sequence when a c end of frame signal is received. In FIG. 10, the test for failure is designated "clock down?" This will now be explained.

Figure 7:
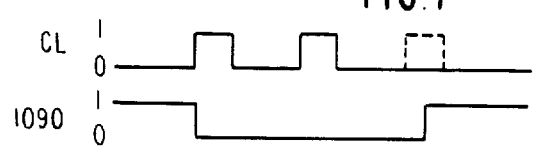
FIG. 7 is a time chart demonstrating the operation of the circuit 109 shown in FIG. 6.
Figure 6:
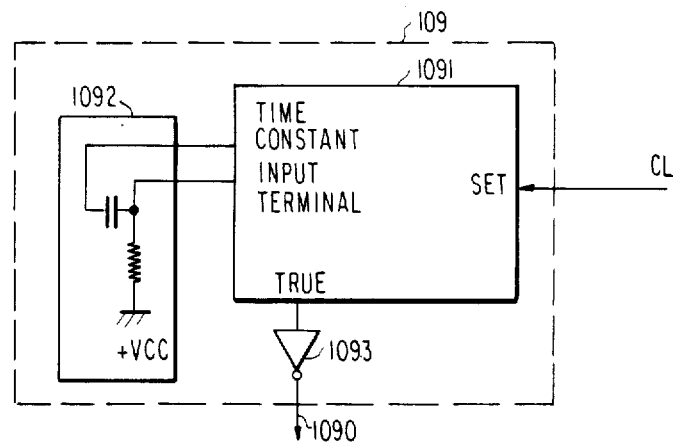
FIG. 6 is a diagram of a clock down detecting circuit 109 shown in FIG. 2.

The failure of a processor is detected by sensing that the processor has ceased sending clock pulses. Referring back to FIG. 2, the clock pulses from processor 31 are supplied to a clock receiver 111 via line 312 and then to a clock down detecting circuit 109. The latter circuit can be understood by reference to FIGS. 6 and 7. The clock down circuit 109 comprises a multivibrator 1091 having a time constant set by time constant circuit 1092. As the time constant is longer than the interval between clock pulses, the output will remain TRUE or high, and the inverter 1093 output will remain low, for as long as the pulses continue. However when the pulses cease, the inverter output will rise to a TRUE or high level. This, in turn sets flip-flop 110, which supplies a failure signal to the controller 107.

Figure 8:
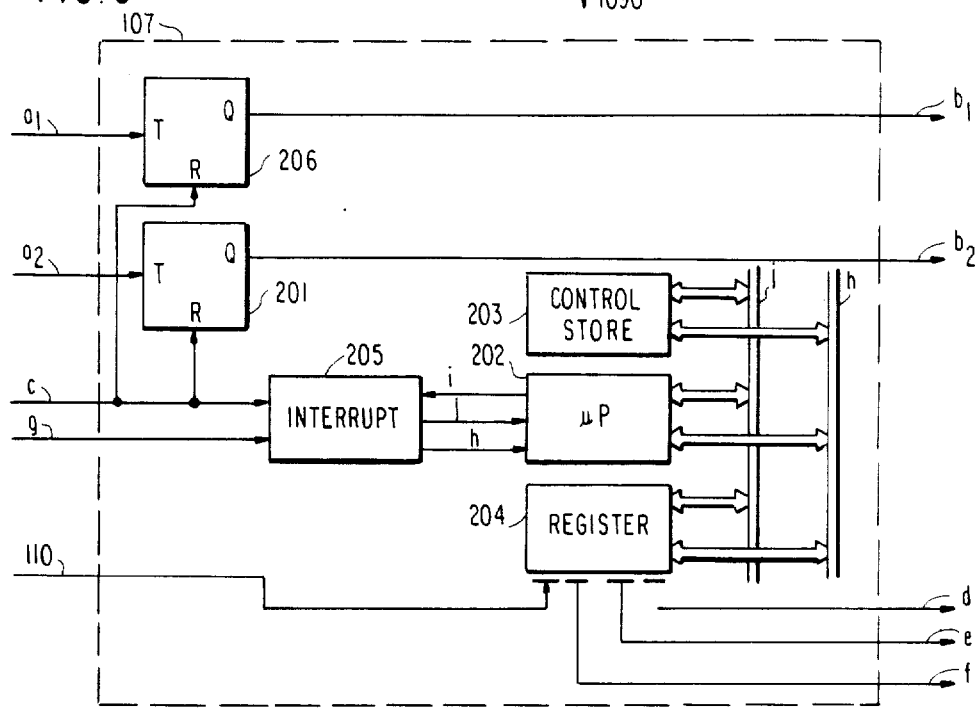
FIG. 8 is a diagram of a controller 107 shown in FIG. 2.

An example of the controller 107 is illustrated in FIG. 8. Control signal a₁, which comes from detector 101 and indicates that the received frame is destined for processor 31, is applied to flip-flop 206.

Referring to FIG. 8, the controller 107 comprises flip-flops 201 and 206, a microprocessor 202, a control store 203, a register 204 and an interruption control circuit 205.

Figure 9:
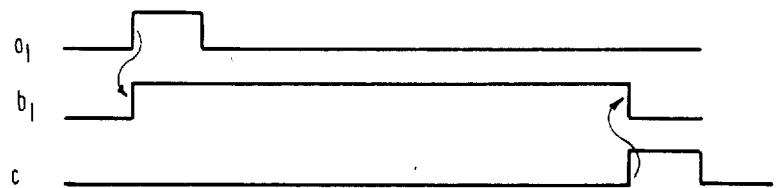
FIG. 9 is a time chart demonstrating the operation of the controller 107 shown in FIG. 2.

Referring to FIGS. 8 and 9, in response to the self-address detecting signal a₁, the flip-flop 206 provides a control signal b₁. Otherwise, in response to the other address detecting signal a₂, control signal b₂ is provided by the flip-flop 201. The control signals b₁ and b₂ are terminated by the frame end detecting signal c.

Referring to FIGS. 8, 10 and 11, the operations of the microprocessor 202, the control store 203, the register 204, and the interruption control circuit 205 are as follows. The interruption control circuit 205 is allowed to receive the earliest of the two frame end detecting signals c and g. If the signal c is applied at the circuit 205 earlier, the signal g will not be accepted.

When the circuit 205 receives the signal c, the circuit 205 generates an interruption signal h. In response to the signal h, the control store 203 and the microprocessor 202 check whether the clock down signal has been applied to the clock down designating field of the register 204 from flip-flop 110. If a clock down signal is not in the register 204, a frame transmitting designation signal e is sent out to the shift register 105. If the clock down signal is in register 204, the frame trigger signal d for initiating failure notification is sent out to the circuit 108. When the latter sequence is over, the microprocessor 202 provides a signal i, which designates the termination of sending signal operation, to the circuit 205, thereby allowing the circuit 205 to receive the signal g.

When the circuit 205 receives the signal g, an interruption signal j is transmitted to the microprocessor 202.

In response to the signal j, the microprocessor 202, the control store 203, and the register 204 send the frame transmission designating signal f to the memory 106.

The failure signal d generated by controller 107 initiates the transmission of a failure notification data frame from failure frame generator 108. An example of the interconnection of generator 108 with the shift register 105 and the control signal d is illustrated in FIG. 5.

Figure 5:
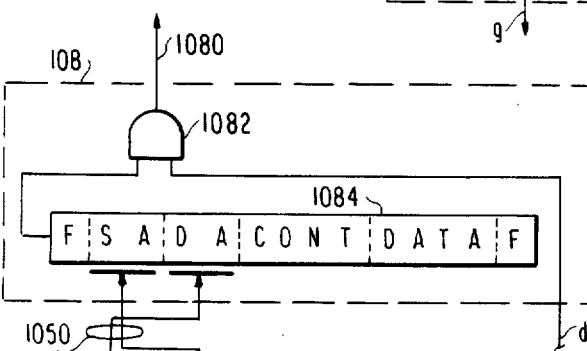
FIG. 5 is a diagram of a register 105, a circuit 108 and lines 1050 and 1080 shown in FIG. 2.

Referring to FIG. 5, the generator 108 comprises a buffer 1081 for storing a failure notice frame, and an AND gate 1082. The buffer 1081 stores a failure notice frame having predetermined bits without a destination address (DA) field and a source address (SA) field. The destination address (DA) field portion in the buffer 1081 stores the content of the source address (SA) field in the shift register 105. The source address (SA) field portion in the buffer 1081 stores the content of the destination address field (DA) in the shift register 105. The generator 108 sends out the failure notice frame from the buffer 1081 to a line 1080 via an AND gate 1082, in response to a trigger signal d for the failure notice frame.

Thus the failure notice frame, now destined for processor 34 (assuming processor 34 is the source of the data frame in S/R 105) is sent onto loop path 10 via driver 102. When received by processor 34, the latter processor will detect the source address and know the failure occurred in processor 31.

Notification of failure according to the present invention is carried out without increasing the traffic significantly on the common path. Also by notifying the processor that wants to communicate with the failed processor, the former will not fill the common path with data frames destined for the latter.

Also, failure notification is achieved with a minimum of additional structure, specifically, a clock down detection circuit, a flip-flop, and a failure frame generator.

What is claimed is:

1. In a data transmission system comprising, a plurality of data processors interconnected via a common loop path, each said data processor connected to said loop via a respective node station, said data processors communicating with each other by transmitting data frames via an associated node station onto said common loop, said data frame including a destination address identifying the recipient data processor and a source address identifying the sending data processor; each said node station comprising, means for receiving data frames from said common loop path and detecting whether or not said data frame includes a destination address corresponding to the data processor associated with said node station, failure detection means for detecting a failure of said associated data processor and, in response thereto, generating a failure signal, failure notification frame generator means responsive to said received and detected data frame having the destination address of said associated data processor for providing a failure notification data frame including a destination address and a source address corresponding to the source address and destination address, respectively, of said received and detected data frame, and means responsive to said failure signal for sending onto said common loop path said failure notice data frame, the improvement wherein said failure detection means comprises means for receiving clock pulses from said associated data processor and detecting the cessation of clock pulses from said associated data processor, and said means for receiving clock pulses comprises a single shot multivibrator providing a TRUE output for a predetermined duration in response to input pulses applied thereto, means for applying a train of clock pulses from said associated data processor as input pulses to said multivibrator, and an inverter connected to the output of said multivibrator, whereby the output of said inverter becomes a TRUE signal when said associated data processor ceases providing clock pulses, said latter TRUE signal constituting said failure signal.

2. The invention of claim 1 further comprising, storage means for storing said failure signal, and register means connected to said receiving means for storing a received data frame detected as including the destination address of said associated data processor, means for transferring the destination address and source address data in said storage register to the source address field and destination address field of said failure notice data frame in said failure notice data frame generator, and means responsive to said stored failure signal and the detection of a data frame having the destination address of said associated data processor for sending said failure notice data frame to said common loop path.

* * * * *